United States Patent
Salehudin et al.

(10) Patent No.: US 9,141,531 B1
(45) Date of Patent: Sep. 22, 2015

(54) DATA FLUSH FROM CACHE TO DISK BASED ON TRACK LIMIT

(71) Applicant: Western Digital Technologies, Inc., Irvine, CA (US)

(72) Inventors: Aznizam Abdullah Salehudin, Bandar Baru Bangi (MY); Kai Ling Lee, Shah Alam (MY)

(73) Assignee: Western Digital Technologies, Inc., Irvine, CA (US)

( * ) Notice: Subject to any disclaimer, the term of this patent is extended or adjusted under 35 U.S.C. 154(b) by 196 days.

(21) Appl. No.: 13/716,059

(22) Filed: Dec. 14, 2012

(51) Int. Cl.
*G06F 12/02* (2006.01)

(52) U.S. Cl.
CPC .................................. *G06F 12/0246* (2013.01)

(58) Field of Classification Search
USPC .......................... 711/112, 113, 135, 141, 143
See application file for complete search history.

(56) References Cited

U.S. PATENT DOCUMENTS

| | | | |
|---|---|---|---|
| 5,636,355 A * | 6/1997 | Ramakrishnan et al. | 711/113 |
| 6,658,532 B1 | 12/2003 | Horrigan et al. | |
| 7,085,895 B2 | 8/2006 | Kishi | |
| 7,353,334 B2 | 4/2008 | Horn et al. | |
| 7,721,049 B2 | 5/2010 | Ehrlich et al. | |
| 7,865,658 B2 | 1/2011 | Lasser et al. | |
| 8,832,366 B1 * | 9/2014 | Huynh | 711/113 |
| 2003/0056059 A1 * | 3/2003 | Fox et al. | 711/112 |
| 2004/0073751 A1 | 4/2004 | Horrigan et al. | |
| 2011/0025151 A1 * | 2/2011 | Lim et al. | 310/90 |
| 2011/0246723 A1 * | 10/2011 | Van Der Wolf et al. | 711/143 |
| 2011/0264843 A1 * | 10/2011 | Haines et al. | 711/103 |

OTHER PUBLICATIONS

Tanenbaum, Structured Computer Organization (Second Edition), 1984, pp. 10-12.*

* cited by examiner

*Primary Examiner* — Aimee Li
*Assistant Examiner* — Dustin Bone

(57) ABSTRACT

A disk drive having a disk, a head actuated over the disk, a volatile semiconductor memory (VSM), a command queue, and control circuitry operable to receive a plurality of write commands from a host, store the plurality of write commands in the command queue, store write data for the plurality of write commands in the VSM, and flush, from the VSM to the disk, a portion of the write data corresponding to a predetermined number of tracks.

30 Claims, 6 Drawing Sheets

DATA FLUSH FROM CACHE TO DISK BASED ON TRACK LIMIT

BACKGROUND

1. Field

The present disclosure relates generally to information storage devices, and in particular to a disk drive.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Disk drives may comprise a volatile semiconductor memory for caching user data before it is written to the disk. This improves performance of the disk drive as seen by the host since the disk drive can immediately return a "ready" status in response to a write command rather than require the host to wait until the user data has been written to the disk. The write data stored in the write cache is flushed to the disk at a later time, such as during an idle mode or when a flush command is received from the host. Deferring the flushing of write data from a write cache to the disk is typically referred to as write-back caching.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figures 1A, 1B:
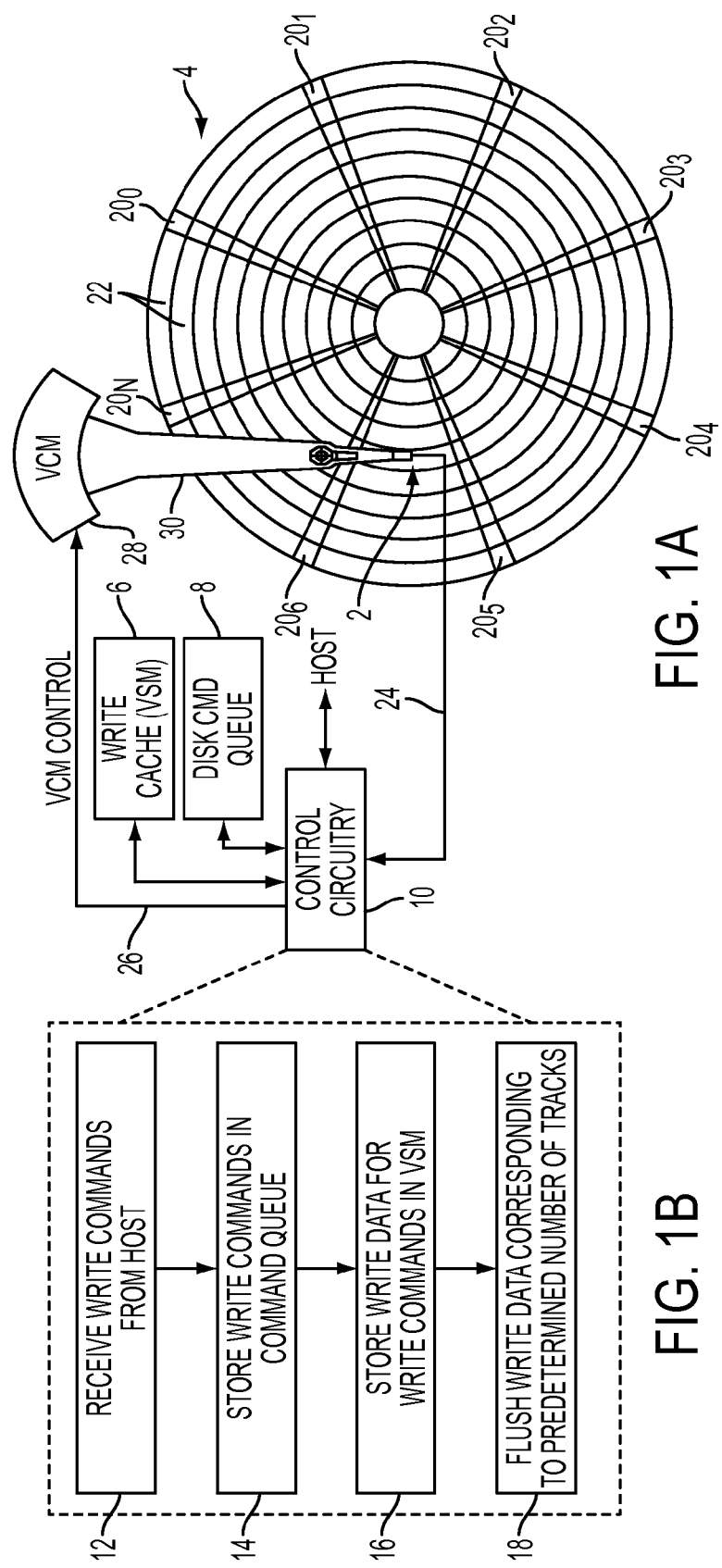
FIG. 1A shows a disk drive according to an embodiment comprising a head actuated over a disk and a volatile semiconductor memory (VSM).
FIG. 1B is a flow diagram illustrating a process performed when write commands are received from a host, according to an embodiment.

FIG. 1A illustrates a disk drive according to an embodiment comprising a head 2 actuated over a disk 4, a volatile semiconductor memory (VSM) 6, and a command queue 8. The disk drive further comprises control circuitry 10 operable to execute the flow diagram of FIG. 1B, wherein a plurality of write commands received from a host (block 12) are stored in the command queue 8 (block 14), and write data for the write commands is stored in the VSM 6 (block 16). Write data corresponding to a predetermined number of tracks is then flushed from the VSM 6 to a non-volatile memory (NVM) such as the disk 4 (block 18).

In the disk drive of FIG. 1A, a plurality of embedded servo sectors $20_0$-$20_N$ are recorded on the disk 4 to define a plurality of data tracks 22 each comprising a number of data sectors. Each servo sector comprises suitable position information, such as a track address providing coarse position information and servo bursts providing fine position information. As the head 2 passes over a servo sector, the control circuitry 10 demodulates a read signal 24 emanating from the head into a position error signal (PES). The PES is filtered by a suitable compensation filter to generate a control signal 26 applied to a voice coil motor (VCM) 28. The VCM 28 rotates an actuator arm 30 about a pivot in order to position the head 2 radially over the disk 4 in a direction that reduces the PES.

In one embodiment, the write data cached in the VSM 6 may be flushed to the disk 4 during an idle time (i.e., a time when host commands are not being processed). Alternatively, the host may transmit a command to the disk drive requesting that the cached write data be flushed immediately to the disk 4. The command received from the host may be a flush command, or a reset command, or any other command that requires the write data be flushed from the VSM 6. However, processing of subsequent host commands may be delayed due to a time required to perform the flush operation in a case where data is flushed to many tracks. Accordingly, an embodiment flushes data from the VSM 6 to a predetermined maximum number of data tracks 22, thereby reducing a potential delay in the processing of host commands received during the flush operation.

Figure 2:
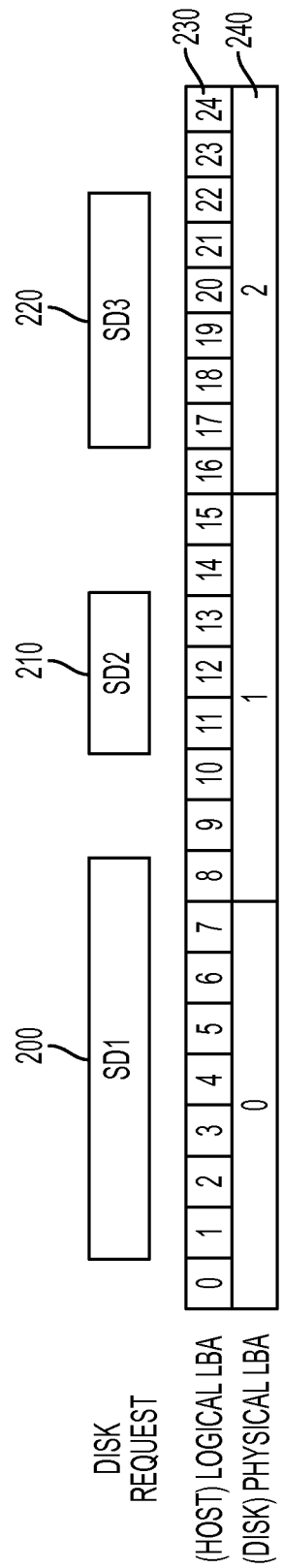
FIG. 2 illustrates a relationship between segment descriptors, host/logical LBA, and disk/physical LBA, according to an embodiment.

FIG. 2 illustrates a relationship between segment descriptors SD1 200, SD2 210, and SD3 220; host/logical LBA 230; and disk/physical LBA 240, according to an embodiment. The VSM 6 is divided into a plurality of contiguous, equally sized groups of sectors, called clusters. Segment descriptors such as SD1 200, SD2 210, and SD3 220 are data structures, each of which describes properties of a segment of the VSM 6 and maps to one or more clusters, depending on how much cached data is referred to by the segment descriptor.

Each segment descriptor references a segment of the VSM 6 that stores the host data that is to be written to (in the case of a write command) or is read from (in the case of a read command) one or more unique logical block addresses (LBAs) that is mapped to a location on the disk 4. For example, SD1 200 references data in the VSM 6 that is to be written to or is read from host/logical LBA 1-8 and disk/physical LBA 0-1. SD2 210 references data in the VSM 6 that is to be written to or is read from host/logical LBA 11-13 and disk/physical LBA 1. SD3 220 references data in the VSM 6 that is to be written to or is read from host/logical LBA 17-22 and disk/physical LBA 2.

Different segment descriptors may reference data in the VSM 6 that is to be written to or is read from different data tracks on the disk 4. For example, a first range of logical block addresses may correspond to sectors in a first data track on the disk 4, and a second range of logical block addresses may correspond to sectors in a second data track on the disk 4.

Figure 3:
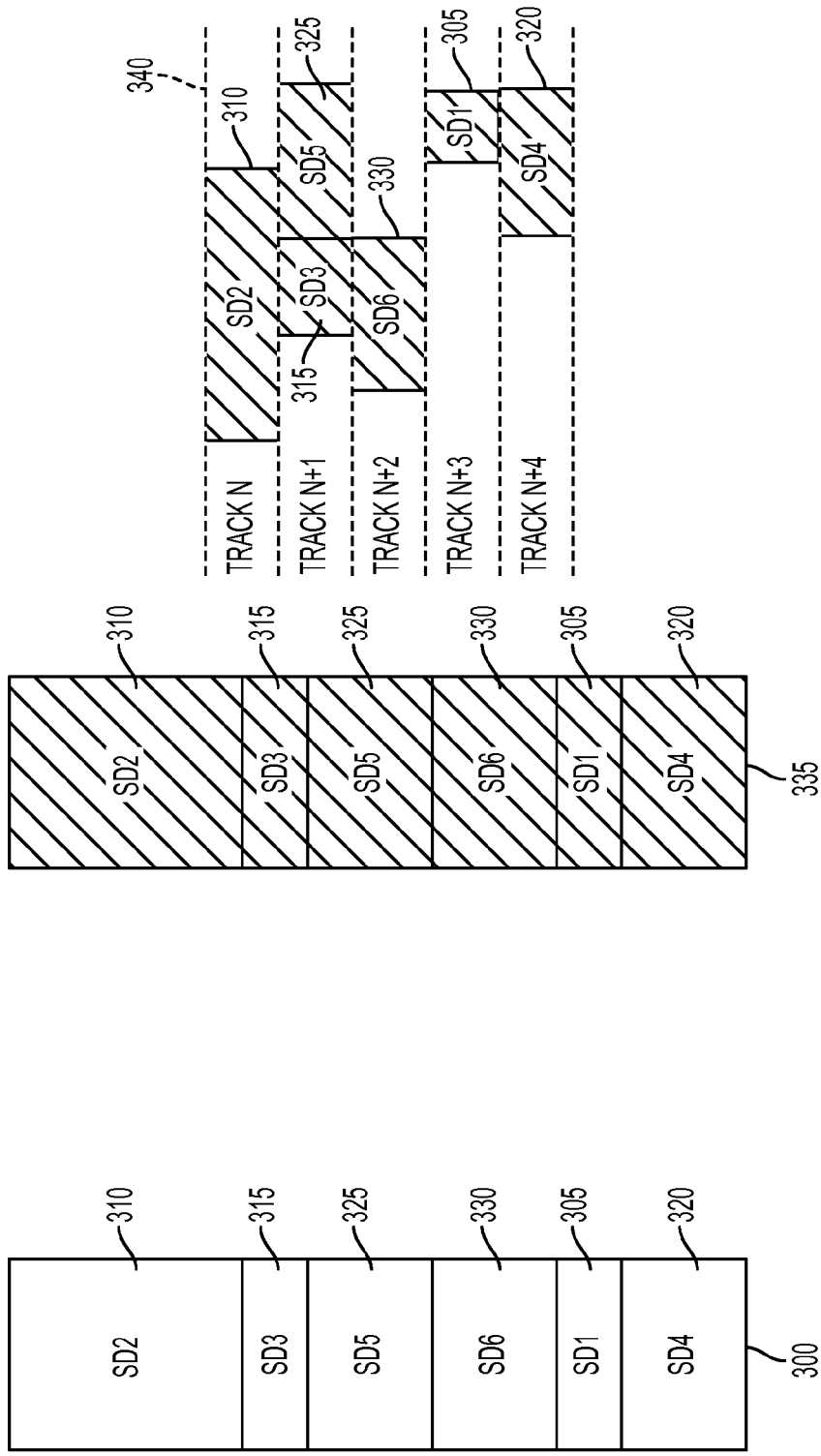
FIG. 3A illustrates a write cache according to the related art, prior to the execution of a data flush.
FIG. 3B illustrates a write cache and tracks on a disk according to the related art, after the execution of a data flush.

FIG. 3A illustrates a write cache 300 according to the related art. Write cache 300 stores write command data that is referenced by the segment descriptors SD2 310, SD3 315, SD5 325, SD6 330, SD1 305, and SD4 320. In the write cache 300 depicted in FIG. 3A, a data flush has not yet been performed, and the data referenced by the segment descriptors SD2 310, SD3 315, SD5 325, SD6 330, SD1 305, and SD4 320 is dirty. Though the write cache 300 depicted in FIG. 3A includes data to be written to five data tracks on the disk 4, in some cases the write cache 300 may include data to be written to 20 or more data tracks on the disk 4.

FIG. 3B illustrates a write cache 335 and data tracks 340 on the disk 4 according to the related art, after a data flush has been performed. In the data flush, all of the write command data in the write cache 335 is flushed from the VSM 6 to the disk 4. In the example illustrated in FIG. 3B, the write command data in the write cache 335 is flushed to five data tracks 340: TRACK N, TRACK N+1, TRACK N+2, TRACK N+3, AND TRACK N+4. Since all of the write command data in the write cache 335 has been flushed from the VSM 6 to the disk 4, the write command data that is referenced by the segment descriptors SD2 310, SD3 315, SD5 325, SD6 330, SD1 305, and SD4 320 is all clean. Crosshatching in FIG. 3B illustrates segment descriptors SD2 310, SD3 315, SD5 325, SD6 330, SD1 305, and SD4 320 that reference clean data in the write cache 335.

Figure 4:
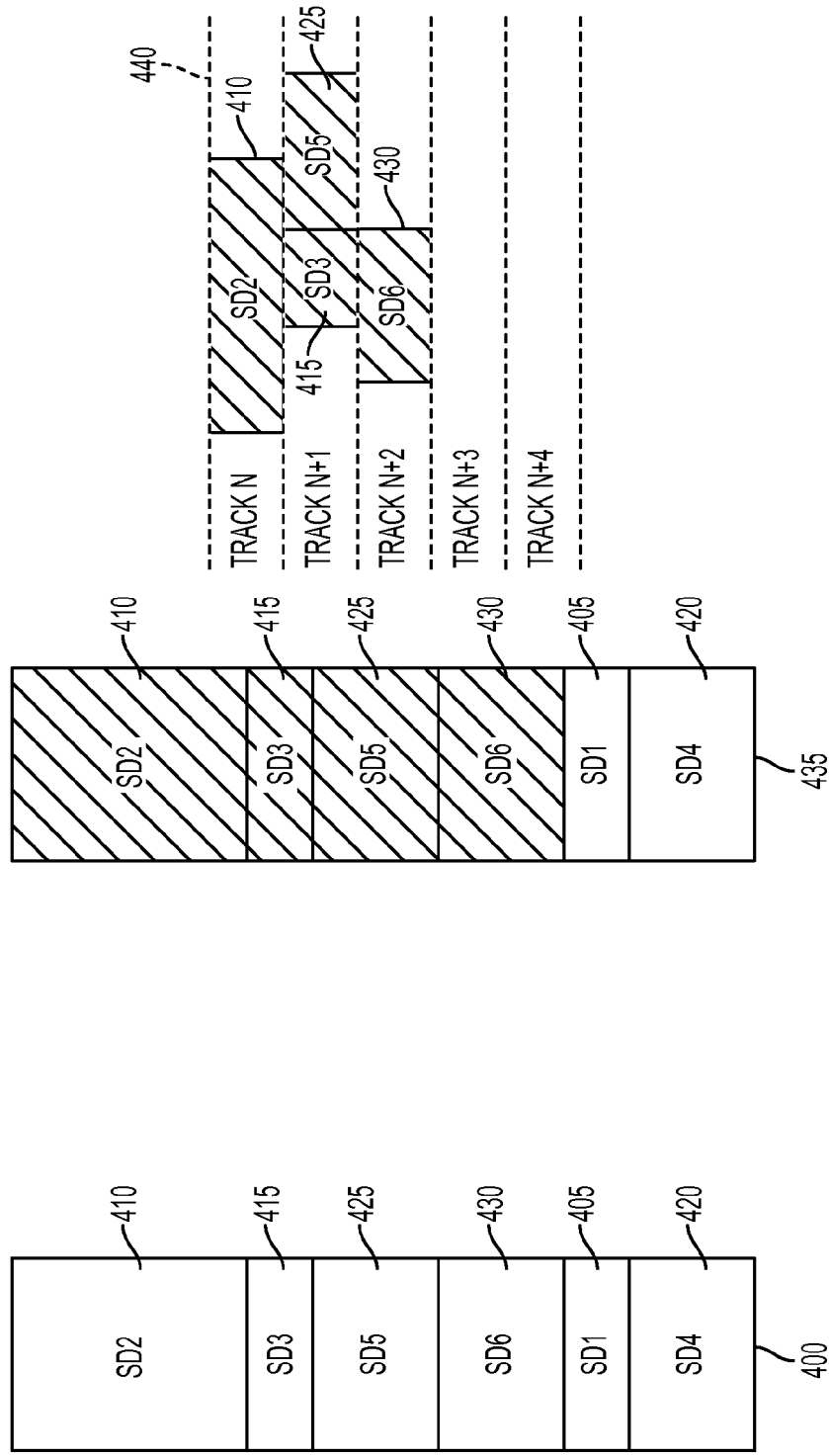
FIG. 4A illustrates a write cache according to an embodiment, prior to the execution of a data flush.
FIG. 4B illustrates a write cache and tracks on a disk according to an embodiment, after the execution of a data flush.

FIG. 4A illustrates a write cache 400 according to an embodiment. Write cache 400 stores write command data that is referenced by the segment descriptors SD2 410, SD3 415, SD5 425, SD6 430, SD1 405, and SD4 420. In the write cache 400 depicted in FIG. 4A, a data flush has not yet been performed, and the data referenced by the segment descriptors SD2 410, SD3 415, SD5 425, SD6 430, SD1 405, and SD4 420 is dirty.

FIG. 4B illustrates a write cache 435 and data tracks 440 on the disk 4 according to an embodiment, after a data flush has been performed. In the data flush according to an embodiment, write command data in the write cache 435 referenced by segment descriptors corresponding to a predetermined number of data tracks 440 is flushed from the VSM 6 to the disk 4.

An example benchmark test may be used to test the performance of a drive. The example benchmark test generates 21,000 sets of 32 read/write commands followed by cache flushes. According to an embodiment, a predetermined number of tracks X is selected as a flush limit based on the following formula:

$$X = \lfloor ((\text{Max Time Limit} - (\text{Actual Time} - (\text{Number of RPO tracks} * \text{Time per rev}))) / \text{Time per rev}) \rfloor$$

In a first example, a max time limit for the data flush is 400 ms, a flush of 20 tracks takes 600 ms to complete as determined by the example benchmark test, and the time required for a revolution of the disk is 12 ms (i.e., the time required to seek to a track and perform a write operation). Using the above formula, 3 tracks is selected as a flush limit:

$$X = \lfloor ((400 - (600 - (20*12)))/12) \rfloor = 3$$

In a second example, a max time limit for the data flush is 400 ms, a flush of 46 tracks takes 900 ms to complete, and the time required for a revolution of the disk is 12 ms. Using the above formula, 4 tracks is selected as a flush limit:

$$X = \lfloor ((400 - (900 - (46*12)))/12) \rfloor = 4$$

In these examples, the calculated flush limit will ensure that time required to complete the flush operation, combined with the time required for the read/write commands including any cache misses, will not exceed approximately 400 ms. Other formulas may also be used to determine a flush limit.

In the example illustrated in FIG. 4B, the write command data in the write cache 435 is flushed to three data tracks 440: TRACK N, TRACK N+1, and TRACK N+2. Specifically, the write command data in the write cache 435 referenced by SD2 410 is flushed from the VSM 6 to track N on the disk 4, the write command data in the write cache 435 referenced by SD3 415 and SD5 425 is flushed from the VSM 6 to track N+1 on the disk 4, and the write command data in the write cache 435 referenced by SD6 430 is flushed from the VSM 6 to track N+2 on the disk 4.

The write command data in the write cache 435 referenced by SD1 405, which is to be written to TRACK N+3, and the write command data in the write cache 435 referenced by SD4 420, which is to be written to TRACK N+4, is not flushed to the disk 4 in the data flush operation that flushes the data referenced by SD2 410, SD3 415, SD5 425, and SD6 430 to the disk 4, because this would result in data being flushed to a number of data tracks that exceeds the predetermined flush limit, which in this example is 3.

Since the write command data in the write cache 435 referenced by SD2 410, SD3 415, SD5 425, and SD6 430 has been flushed to the disk 4, the write command data that is referenced by the segment descriptors SD2 410, SD3 415, SD5 425, and SD6 430 is all clean. Crosshatching in FIG. 4B illustrates segment descriptors SD2 410, SD3 415, SD5 425, and SD6 430 that reference clean data in the write cache 435. The write command data that is referenced by the segment descriptors SD1 405 and SD4 420 remains dirty because it has not yet been flushed to disk.

Figure 5:
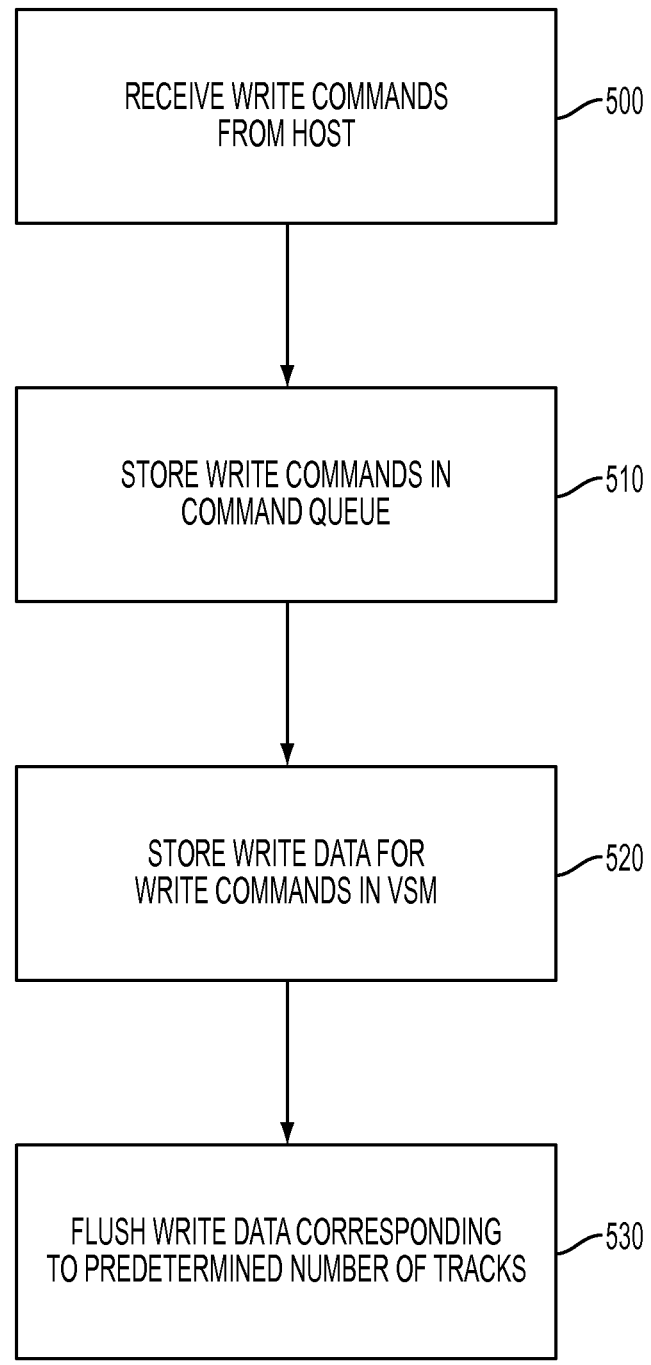
FIG. 5 is a flow diagram illustrating a process performed when write commands are received from a host, according to an embodiment.

FIG. 5 is a flow diagram illustrating a process performed when write commands are received from a host, according to an embodiment. A plurality of write commands are received from a host in block 500. The write commands received from the host are stored in the command queue in block 510, and write data for the write commands is stored in a write cache 400 in the VSM 6 in block 520. Write data corresponding to a predetermined number of data tracks 22 is then flushed from the write cache 400 in the VSM 6 to the disk 4 in block 530.

Figure 6:
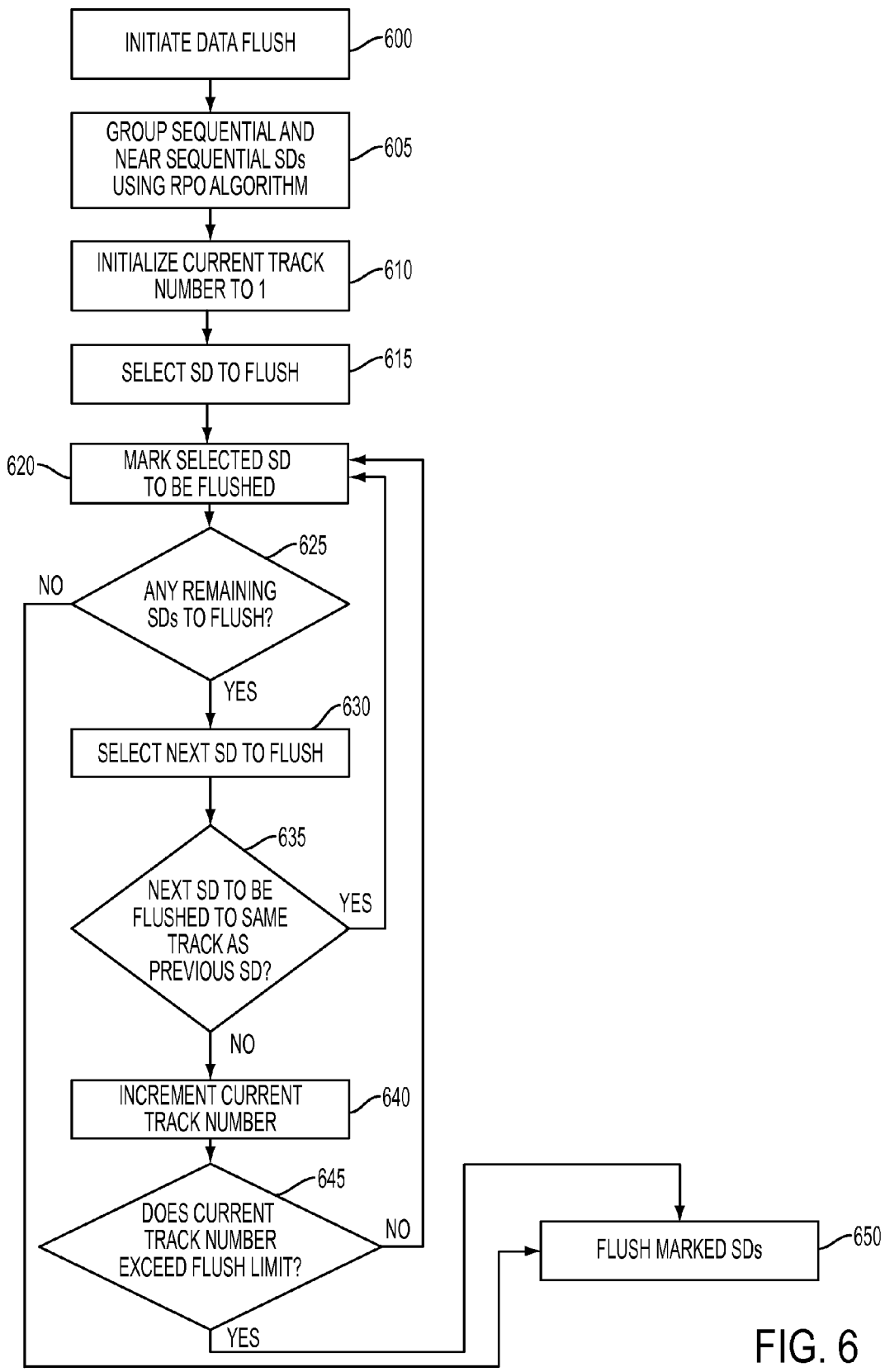
FIG. 6 is a flow diagram illustrating a process wherein write data corresponding to a predetermined number of tracks is flushed, according to an embodiment.

The control circuitry 10 is operable to perform a process of flushing write data corresponding to a predetermined number of tracks from the write cache 400 in the VSM 6 to the disk 4. This process is illustrated in more detail in FIG. 6. In block 600, a data flush is initiated. The data flush may be initiated due to a variety of conditions. For example, the data flush may be initiated by the expiration of a timer after a predetermined period of time when the drive is idle, or by data overlap in the cache (NVM 6) (i.e., an older segment descriptor must be flushed to the disk 4 before new data may be cached in the segment descriptor), or a full cache (NVM 6) (i.e., a flush is required in order to free up data clusters). Other processes or conditions may also trigger the initiation of the data flush in block 600.

In block 605, a rotational position optimization (RPO) algorithm is used to group sequential and near-sequential segment descriptors (e.g., no more than ¼ track away) based on a position of the head 2. The RPO algorithm is an algorithm that reduces command latency by optimizing accesses to the disk 4. The optimization is performed by modeling the drive's ability to arrive at a particular location on the disk 4, as predicted by the firmware.

In block 610, a counter that stores a current track number is initialized to 1. In block 615, a segment descriptor to flush is selected from the sequential and near-sequential segment descriptors that were grouped by the RPO algorithm. In block 620, the segment descriptor selected in block 615 is marked to be flushed.

In block 625, a determination is made as to whether or not there are any remaining segment descriptors to flush. If a determination is made in block 625 that there are no remaining segment descriptors to flush, the flow proceeds to block 650, where the marked segment descriptors are flushed to the disk 4.

If a determination is made in block 625 that there are still segment descriptors to flush, the flow proceeds to block 630, and the next segment descriptor to flush is selected from the sequential and near-sequential segment descriptors that were grouped by the RPO algorithm. In block 635, a determination is made as to whether or not the next segment descriptor to flush selected in block 630 is a segment descriptor that will be flushed to the same data track 22 on the disk 4 as the segment descriptor that was last marked to be flushed. If a determination is made in block 635 that the segment descriptor will be flushed to the same data track 22, then flow proceeds to block 620, and the selected segment descriptor is marked to be flushed.

If a determination is made in block 635 that the segment descriptor will not be flushed to the same data track 22 as the segment descriptor that was last marked to be flushed, then the flow proceeds to block 640, and the current track number is incremented by one. In block 645, a determination is made as to whether or not the current track number exceeds a predetermined flush limit.

According to an embodiment, the predetermined flush limit is determined using the previously described formula, and the predetermined flush limit is 3. If the current track number is greater than 3, then a determination is made that the current track number exceeds the flush limit. According to another embodiment, the predetermined flush limit is 4. If the current track number is greater than 4, then a determination is made that the current track number exceeds the flush limit.

If it is determined that the current track number does not exceed the flush limit in block 645, then the flow proceeds to block 620, and the segment descriptor selected in block 630 is marked to be flushed. If it is determined that the current track number exceeds the flush limit in block 645, then the flow proceeds to block 650, and the marked segment descriptors are flushed to the disk 4.

In another embodiment, instead of limiting the number of tracks to flush in a data flush operation, a time to perform a data flush operation is limited. An optimal fixed flush time is determined, and using the determined optimal fixed flush time, a number of tracks that can be flushed without exceeding the optimal fixed flush time is determined.

In yet another embodiment, a non-volatile memory (NVM) is provided in place of a mechanical disk drive. In this embodiment, write data for a plurality of write commands is stored in a VSM, and a flush is performed, from the VSM to the NVM, for a portion of the write data that is flushable in a duration that does not exceed a predetermined maximum flush duration.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A disk drive comprising:
    a disk;
    a head actuated over the disk;
    a volatile semiconductor memory (VSM);
    a command queue; and
    control circuitry to:
        receive a plurality of write commands from a host;
        store the plurality of write commands in the command queue;
        store write data for the plurality of write commands in the VSM; and
        flush, from the VSM to the disk, a portion of the write data corresponding to a predetermined number of tracks, wherein the predetermined number of tracks comprises a limit on a number of tracks that are accessed when flushing the portion of the write data and wherein the predetermined number of tracks is based on a revolution time of the disk and one or more other performance measurements of the disk.

2. The disk drive according to claim 1, wherein the predetermined number of tracks used by the control circuitry in performing the flushing is set such that a duration of the flushing does not exceed a predetermined maximum duration.

3. The disk drive according to claim 1, wherein the control circuitry is further operable to perform the flushing using a rotational position optimization algorithm that selects sequential and near-sequential segment descriptors to flush.

4. The disk drive according to claim 1, wherein the control circuitry is further to perform the storing the write data for the plurality of write commands by storing a plurality of segment descriptors.

5. The disk drive according to claim 4, wherein the control circuitry is further to perform a flushing process by which the portion of the write data corresponding to the predetermined number of tracks is flushed, the flushing process comprising:
    selecting a segment descriptor that is to be flushed from the plurality of segment descriptors;
    marking the selected segment descriptor to be flushed from the VSM to the disk;
    repeating the selecting the segment descriptor and the marking the selected segment descriptor to be flushed until segment descriptors referencing the portion of the write data corresponding to the predetermined number of tracks have been marked to be flushed from the VSM to the disk; and
    flushing, from the VSM to the disk, the segment descriptors marked to be flushed.

6. The disk drive according to claim 5, wherein the flushing process performed by the control circuitry further comprises:

storing a current track number corresponding to a number of the tracks on the disk to which the segment descriptors marked to be flushed will be flushed;

in the selecting the segment descriptor that is to be flushed, incrementing the current track number when a track to which the selected segment descriptor is to be flushed is changed from a track to which a previously selected segment descriptor is to be flushed; and when the current track number exceeds the predetermined number of tracks, performing the flushing, from the VSM to the disk, of the segment descriptors marked to be flushed.

7. The disk drive according to claim 6, wherein the predetermined number of tracks used by the control circuitry in performing the flushing is set such that a duration of the flushing process does not exceed a predetermined maximum duration.

8. The disk drive according to claim 7, wherein the predetermined number of tracks used by the control circuitry in performing the flushing is set based on revolutions per minute (RPM) of the disk.

9. The disk drive according to claim 6, wherein the predetermined number of tracks used by the control circuitry in performing the flushing is 3.

10. The disk drive according to claim 9, wherein the disk spins at 5400 revolutions per minute (RPM).

11. A method of flushing write data in a disk drive, the method comprising:

receiving a plurality of write commands from a host;

storing the plurality of write commands in a command queue;

storing the write data for the plurality of write commands in a volatile semiconductor memory (VSM); and flushing, from the VSM to a disk, a portion of the write data corresponding to a predetermined number of tracks, wherein the predetermined number of tracks comprises a limit on a number of tracks that are accessed when flushing the portion of the write data and wherein the predetermined number of tracks is based on a revolution time of the disk and one or more other performance measurements of the disk.

12. The method according to claim 11, wherein the predetermined number of tracks is set such that a duration of the flushing does not exceed a predetermined maximum duration.

13. The method according to claim 11, wherein the flushing comprises using a rotational position optimization algorithm that selects sequential and near-sequential segment descriptors to flush.

14. The method according to claim 11, wherein the storing the write data for the plurality of write commands comprises storing a plurality of segment descriptors.

15. The method according to claim 14, wherein the flushing comprises:

selecting a segment descriptor that is to be flushed from the plurality of segment descriptors;

marking the selected segment descriptor to be flushed from the VSM to the disk;

repeating the selecting the segment descriptor and the marking the selected segment descriptor to be flushed until segment descriptors referencing the portion of the write data corresponding to the predetermined number of tracks have been marked to be flushed from the VSM to the disk; and flushing, from the VSM to the disk, the segment descriptors marked to be flushed.

16. The method according to claim 15, wherein the flushing further comprises:

storing a current track number corresponding to a number of the tracks on the disk to which the segment descriptors marked to be flushed will be flushed;

in the selecting the segment descriptor that is to be flushed, incrementing the current track number when a track to which the selected segment descriptor is to be flushed is changed from a track to which a previously selected segment descriptor is to be flushed; and when the current track number exceeds the predetermined number of tracks, performing the flushing, from the VSM to the disk, of the segment descriptors marked to be flushed.

17. The method according to claim 16, wherein the predetermined number of tracks is set such that a duration of the flushing process does not exceed a predetermined maximum duration.

18. The method according to claim 17, wherein the predetermined number of tracks is set based on revolutions per minute (RPM) of the disk.

19. The method according to claim 16, wherein the predetermined number of tracks used in performing the flushing is 3.

20. The method according to claim 19, wherein the disk spins at 5400 revolutions per minute (RPM).

21. A non-transitory computer readable medium storing a program causing control circuitry in a disk drive to execute a process for flushing write data in the disk drive, the process comprising:

receiving a plurality of write commands from a host;

storing the plurality of write commands in a command queue;

storing the write data for the plurality of write commands in a volatile semiconductor memory (VSM); and flushing, from the VSM to a disk, a portion of the write data corresponding to a predetermined number of tracks, wherein the predetermined number of tracks comprises a limit on a number of tracks that are accessed when flushing the portion of the write data and wherein the predetermined number of tracks is based on a revolution time of the disk and one or more other performance measurements of the disk.

22. The non-transitory computer readable medium according to claim 21, wherein the predetermined number of tracks is set such that a duration of the flushing does not exceed a predetermined maximum duration.

23. The non-transitory computer readable medium according to claim 21, wherein the flushing comprises using a rotational position optimization algorithm that selects sequential and near-sequential segment descriptors to flush.

24. The non-transitory computer readable medium according to claim 21, wherein the storing the write data for the plurality of write commands comprises storing a plurality of segment descriptors.

25. The non-transitory computer readable medium according to claim 24, wherein the flushing comprises:

selecting a segment descriptor that is to be flushed from the plurality of segment descriptors;

marking the selected segment descriptor to be flushed from the VSM to the disk;

repeating the selecting the segment descriptor and the marking the selected segment descriptor to be flushed until segment descriptors referencing the portion of the write data corresponding to the predetermined number of tracks have been marked to be flushed from the VSM to the disk; and flushing, from the VSM to the disk, the segment descriptors marked to be flushed.

26. The non-transitory computer readable medium according to claim 25, wherein the flushing further comprises:
- storing a current track number corresponding to a number of the tracks on the disk to which the segment descriptors marked to be flushed will be flushed;
- in the selecting the segment descriptor that is to be flushed, incrementing the current track number when a track to which the selected segment descriptor is to be flushed is changed from a track to which a previously selected segment descriptor is to be flushed; and
- when the current track number exceeds the predetermined number of tracks, performing the flushing, from the VSM to the disk, of the segment descriptors marked to be flushed.

27. The non-transitory computer readable medium according to claim 26, wherein the predetermined number of tracks is set such that a duration of the flushing process does not exceed a predetermined maximum duration.

28. The non-transitory computer readable medium according to claim 27, wherein the predetermined number of tracks is set based on revolutions per minute (RPM) of the disk.

29. The non-transitory computer readable medium according to claim 26, wherein the predetermined number of tracks used by the control circuitry in performing the flushing is 3.

30. The non-transitory computer readable medium according to claim 29, wherein the disk spins at 5400 revolutions per minute (RPM).

* * * * *